(12) United States Patent
Mauro, II (10) Patent No.: US 7,133,696 B2
(45) Date of Patent: Nov. 7, 2006

(54) CHANGING THE OPERATIONAL MODE OF A WIRELESS COMMUNICATION DEVICE USING A VOICE SERVICE OPTION

(75) Inventor: Anthony Patrick Mauro, II, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 447 days.

(21) Appl. No.: 10/319,239

(22) Filed: Dec. 13, 2002

(65) Prior Publication Data

US 2004/0203937 A1 Oct. 14, 2004

(51) Int. Cl.
*H04M 1/00* (2006.01)

(52) U.S. Cl. ............... 455/560; 455/507; 455/557; 704/271; 704/270

(58) Field of Classification Search ........... 455/552, 455/553, 552.1, 553.1, 168.1, 188.1, 166.2, 455/560, 557, 556; 379/52
See application file for complete search history.

(56) References Cited

U.S. PATENT DOCUMENTS

| | | | |
|---|---|---|---|
| 6,381,472 B1 * | 4/2002 | LaMedica et al. | 455/560 |
| 6,611,804 B1 * | 8/2003 | Dorbecker et al. | 704/271 |
| 6,768,904 B1 * | 7/2004 | Kim | 455/414.1 |
| 2003/0119518 A1 * | 6/2003 | Cleveland et al. | 455/450 |
| 2005/0063520 A1 * | 3/2005 | Michaelis | 379/52 |

FOREIGN PATENT DOCUMENTS

EP 0 642 277 3/1995

* cited by examiner

*Primary Examiner*—Joseph Feild
*Assistant Examiner*—Julio Perez
(74) *Attorney, Agent, or Firm*—Philip Wadsworth; Sandra L. Godse; Kent Baker (57) ABSTRACT

Changing a mode of operation of a destination communication device by establishing a voice service option communication channel over a network between an initiating device and a destination device. Using the voice service option communication channel, a predetermined sequence of data is transmitted from the initiating device to the destination device. The predetermined sequence of data specifies a different operation mode of the destination device. The destination device receives the data packet and determines if it is a predetermined sequence of data. If the data packet is a predetermined sequence of data then the destination device examines the sequence of data and changes its operational mode in response to the predetermined sequence of data. The predetermined sequence of data may be transmitted in compliance with a TTY standard for data communication.

30 Claims, 5 Drawing Sheets

CHANGING THE OPERATIONAL MODE OF A WIRELESS COMMUNICATION DEVICE USING A VOICE SERVICE OPTION

BACKGROUND

1. Field

The invention relates generally to control of communication devices in a communication system, and more specifically to data transfer over a voice channel of the communication channel.

2. Background

Enhancements to communication devices are being developed and it may be desirable, or necessary, to change the operating mode of the communication device to utilize the enhancements. The operating mode of a communication device may be changed by transmitting initiating data to the communication device requesting that the communication device change its operating mode.

A technique that could be used to transmit the initiating data to change the operational mode of a destination communication device, is to transmit the initiating data over a voice channel. Typically, a user at the initiating device would use the device's keypad to enter the initiating data as a data sequence formatted as FSK or DTMF tones The tones are then encoded by a vocoder, a device used to encode and decode speech, and data corresponding to the tones are transmitted to the destination communication device.

In a destination device, a host processor receives the data corresponding to the sequence of tones and sends the data to a vocoder that decodes the tones. The tones are then converted back into the initiating data and the host processor determines that a special (changed) operational mode is desired by the initiating device. In response, the host processor of the destination device changes its operational mode and sends a message to the initiating device that will confirm the changed operational mode and will result in both devices operating in the desired mode. This technique may be used, for example, when two users want to communicate using a secure connection to transfer encrypted data.

A problem with this technique is that vocoders are optimized for encoding speech and are not well adapted to encode and decode pure tones such as would be used in data formatted as FSK or DTMF data. Also, the vocoder encoded data may be decoded and re-encoded as the data traverses a voice channel of a communication system. These, as well as other, problems lead to ineffective, and unreliable, transmission of the initiating data over the voice channel.

A technique used to transfer text messages across a communication system is Short Message Service (SMS). SMS is a service that enables the transmission of text messages between wireless communication devices (WCD). However, SMS is not supported in all networks. In addition, SMS messages are not used to transmit data to change the operational mode of a device, instead when the message is received it is simply displayed to the user. In addition, SMS messages are routed through a SMS center thereby adding delay in the signal arriving at the destination device.

There is therefore a need in the art for transmitting data that is used to change the operational mode of a communication device when the WCD is operating in a voice service option mode.

SUMMARY

Embodiments disclosed herein address the above stated needs by using a voice service option as a means for reliably transmitting data that may be used for changing the operational mode of a communication device.

In one aspect, a mode of operation of a destination communication device is changed by establishing a voice service option communication channel between an initiating device and the destination device. Using the voice service option communication channel, a predetermined sequence of data is sent from the initiating device to the destination device. The predetermined sequence of data specifies a special operation mode of the destination device.

The destination device receives the data sequence and, upon examining and determining that it corresponds to the predetermined sequence of data, changes its operational mode in response.

In another aspect, the predetermined sequence of data that is transmitted over the voice service option communication channel complies with a TTY standard for data transfer.

The initiating device and the destination device may be wireless communication devices. The initiating device may be a wireless communication device and the destination device may be a landline communication device. The initiating device may be a landline communication device and the destination device may be a wireless communication device. The initiating device and the destination device may both be landline communication devices.

In yet another aspect, changing the operational mode of a destination communication device includes intercepting a data packet in an initiating device. The intercepted data packet is then modified such that the modified data packet comprises a predetermined sequence of data for configuring a mode of operation of the destination device. The modified data packet is then transmitted from the initiating device. The modified data packet may comply with a standard, such as the TTY standard. Also, the data packet may be output by a digital signal processor and intercepted by a host processor. The digital signal processor may be configured to include a vocoder.

In a further aspect of the initiating device, the communication system includes a first wireless communication device with a digital signal processor configured to output data packets. The first wireless device also includes a host processor configured to intercepting an output of the digital signal processor and modify desired data bits in the digital signal processor output such that the modified output includes data for configuring an operational mode of another wireless communication device. The first wireless device also includes a transmitter configured to accept the modified output from the host processor and to transmit the modified output in a voice service option operational mode. The modified data may be TTY compliant.

The communication system also includes a second wireless communication device with a receiver configured to receive data packets in a voice service option operational mode. The receiver outputs the received data packets to a host processor in the destination device. The host processor receives the data packets and determines if the received data packet includes a message to change the operational mode of the wireless communication device. If the received data packet includes a predetermined sequence of data to initiate a change in the operational mode then the host processor acts to modify the operational mode accordingly.

Other features and advantages of the present invention should be apparent from the following description of exemplary embodiments, which illustrate, by way of example, aspects of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
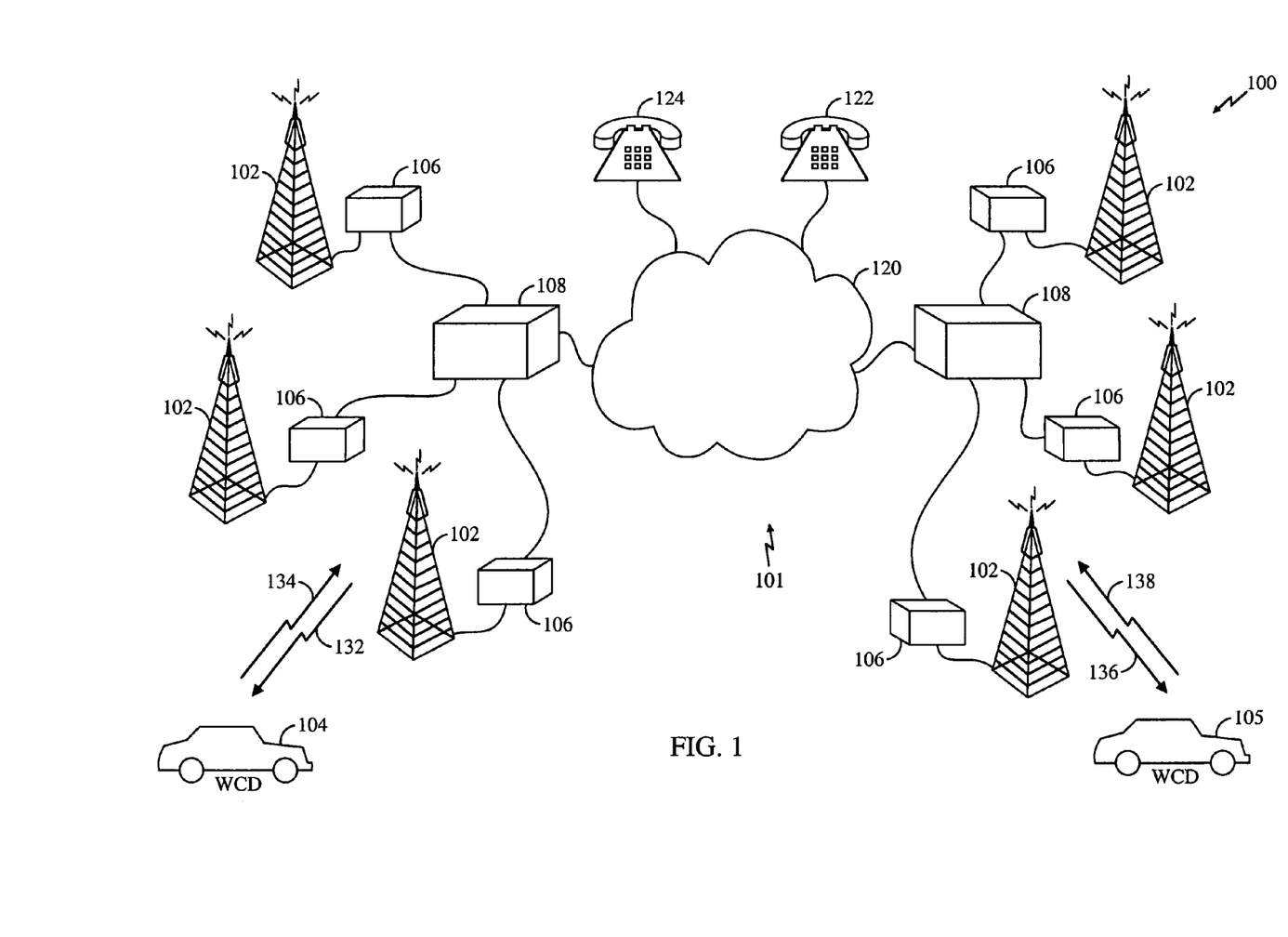
FIG. 1 shows portions of a communication system constructed in accordance with the present invention.

FIG. 1 shows portions of a communication system 100 constructed in accordance with the present invention. The communication system 100 includes an infrastructure 101, multiple wireless communication devices (WCD) 104 and 105 and landline communication devices 122 and 124. In general, WCDs may be either mobile or fixed.

The infrastructure 101 also includes other components, such as base stations 102, base station controllers 106, mobile switching centers 108, a switching network 120, and the like. In one embodiment, the base station 102 includes the base station controller 106, and in other embodiments the base station 102 and the base station controller 106 are separate components. Different types of switching networks 120 may be used to route signals in the communication system 100, for example, the switching network 120 may be the public switched telephone network (PSTN).

The term "forward link" refers to the signal path from the infrastructure to a WCD, and the term "reverse link" refers to the signal path from a WCD to the infrastructure. As shown in FIG. 1, WCDs 104 and 105 receive signals 132 and 136 on the forward link and transmit signals 134 and 138 on the reverse link, respectively. In general, signals transmitted from a WCD 104 and 105 are intended for reception at another communication device, such as another remote unit, or a landline communication device 122 and 124, and are routed through the switching network 120. For example, if the signal 134 transmitted from an initiating WCD 104 is intended to be received by a destination WCD 105, the signal is routed through the infrastructure and a signal 136 is transmitted on the forward link to the destination WCD 105. Typically, a communication device, such as a WCD or a landline communication device, may be both an initiator and a destination of signals.

Examples of WCDs 104 include cellular telephones, wireless communication enabled personal computers, and personal digital assistants (PDA), and other wireless devices. The communication system 100 may be designed to support one or more wireless standards. For example, the standards may include standards referred to as TIA/EIA-95-B (IS-95), TIA/EIA-98-C (IS-98), $3^{rd}$ Generation Partnership Project (3GPP); $3^{rd}$ Generation Partnership Project 2 (3GPP2), cdma2000, Wideband CDMA (WCDMA), and others.

Referring again to FIG. 1, if the signals that are transmitted by a communication device are voice messages, then the communication device is operating in a voice service option operational mode. For example, if a WCD 104 is communicating voice messages to another WCD 105, a landline communication device 122, or other communication device 124, then the WCD is operating in a voice service option operational mode. If it is desired to transmit a signal that is not supported by the voice service option operational mode, for example, if it is desired to transmit a data signal, then the WCD must change to a different operational mode.

In many situations it is desirable to have the communication device remain in the voice service option operational mode while the WCD prepares to operate in a different mode. For example, if two communication devices are communicating with each other in a voice service option operational mode and it is desired to change to a secure, encrypted, communication mode, the two communication devices must change from a voice service option operational mode to a data service option operational mode prior to being able to communicate in a secure manner. After changing to the data service option communication channel the communication devices would need to exchange data, such as cryptographic "keys" and the like. Because the "keys" are digital data, they cannot be transmitted while the communication devices are in the voice service option operational mode. Thus, the communication devices would need to terminate their voice channel communication and establish a data channel communication, then transmit initiating data back and forth, such as sending "keys", before being able to re-establish communication in the secure communication mode. It would be desirable to send any initiating data between the communication devices while the communication devices are still communicating over the voice channel. For example, if users are changing to a secure communication mode it is desirable for the users to be able to maintain voice communications while the secure communication mode is being initiated.

As discussed above, a conventional technique used to transmit initiating data over a voice channel is using a vocoder to encode tones representing the data. In accordance with the invention, the system 100 uses the TTY/TDD standard to transmit generic data messages while the WCD is in the voice service option operational mode. The acronym TTY/TDD is used to mean a Teletype, or any telecommunications device capable of supporting real time text conversation on a communication network, such as a text telephone. Examples of text telephones include Telecommunication Device for the Deaf (TDD). The TTY/TDD standard, V.18, provides for a generic data transfer mechanism to support TTY/TDD users. Current CDMA voice service options, IS-733 and IS-127, have both been amended to provide reliable transport of TTY/TDD data making digital wireless technology accessible to TTY/TDD users.

The TTY/TDD amendments to IS-733 and IS-127 are intended to allow a WCD to operate with industry standard TTY devices that comply with Baudot code. The signaling protocol used to transmit the TTY signal is robust, accounting for frame and bit errors in the transmission and thereby improving the reliability of the transmission.

An aspect of the invention is to use the TTY signaling protocol to change an operational mode of a WCD. For example, the TTY signaling protocol may be used to transmit command and control signals between two communication terminals to initiate a secure, encrypted, communication session.

Figure 2:
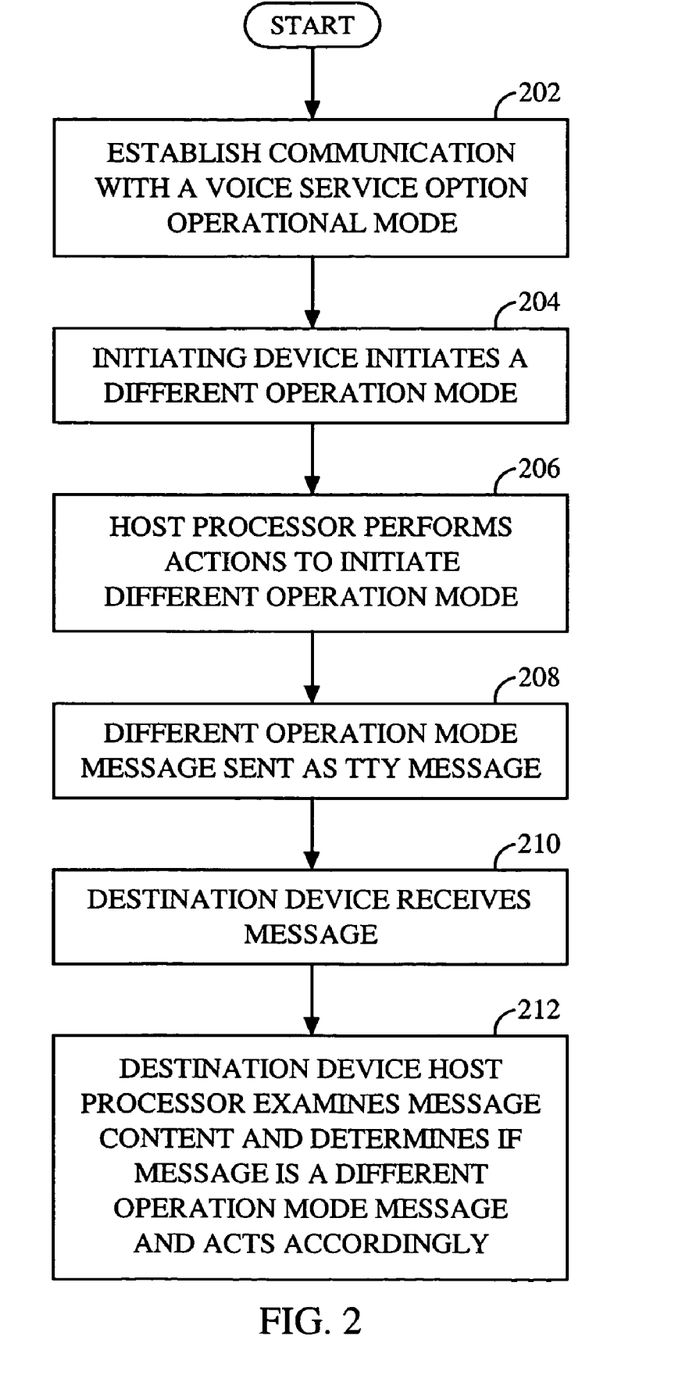
FIG. 2 is a flow diagram illustrating operation of the system illustrated in FIG. 1.

FIG. 2 is a flow diagram illustrating operation of the system illustrated in FIG. 1. Flow begins in block 202 where an initiating device, for example, a WCD or a landline phone that may be configured to operate in different operational modes, establishes communication with a like-configured destination device using a voice service option. Flow continues to block 204 where the user of the initiating device initiates a different operation mode, for example a secure communication operational mode. The initiation may be started by, for example, a user of the initiating device pressing a dedicated button, or a predetermined button on a cell phone keypad, or a specific sequence of keys.

Flow continues to block 206 where a host processor within the initiating device performs actions necessary to initiate the different operation. These actions may include selecting a predetermined sequence of digital data that corresponds to the different operation. A predetermined sequence of digital data for initiating a secure communication operational mode could include an indication of a change in operational mode, encryption keys, desired settings for components within the communication device, such as setting the communication data rate to a desired value, and other operations, according to the system.

In one embodiment, when the initiating device initiates a different operation mode the host processor intercepts data packets from a digital signal processor (DSP) in the initiating device, that would otherwise be routed to a network interface and transmitted to the network, and replaces the intercepted data packets with TTY compliant bit patterns of characters identifying the different operation to a communication device. The TTY compliant bit pattern is then routed to the network interface. For example, the DSP may be configured to include a vocoder and the DSP data packets are the output of the vocoder.

Flow continues to block 208 where the predetermined sequence of data bits for the different operation, having been packaged into a TTY message, are sent from the initiating device to a destination device on a voice service option channel. In block 210 the destination device receives the voice service option channel message including the TTY message. Flow continues to block 212 where a host processor in the destination device examines the content of the received TTY message and determines if the message is a different operational mode message, and responds accordingly.

In block 212, if the destination host processor determines that a special operation mode is called for, then the host processor initiates the sequence of actions necessary for the special operation. If the destination host processor determines that no special operation is called for, then the host processor either directs the received message to a DSP of the WCD, or the host processor decodes the TTY message.

A similar operation sequence is performed for acknowledgement messages or the like, transmitted from the destination device to the initiating device. Thus, the sequence of operations would be similar to those illustrated in FIG. 2, except that the data would be sent from the destination device and would be received and processed by the initiating device.

The initiating and destination devices may be WCDs, landline communication devices, other communication devices, or any combination thereof. In one embodiment, the initiating device is a WCD and the TTY message is sent to a base station. In another embodiment, the initiating device is a landline communication device and the TTY message is sent to a switching network, such as, the PSTN. In one embodiment, the destination device is a WCD and it receives the TTY message from a base station. In another embodiment, the destination device is a landline communication device and it receives the TTY message from a switching network, such as, the PSTN.

For example, if the initiating device is a WCD, it communicates with an initiating base station. The initiating base station receives the voice channel message including the TTY message and regenerates the FSK data corresponding to the predetermined sequence of data. The base station then transmits the regenerated message out over the wireless network infrastructure, through the switching network to a destination device.

In one embodiment the destination device is a WCD. In another embodiment the destination device is a landline communication device that may be configured to operate in different operational modes. When the destination device is a WCD then the regenerated message is sent to the destination device from a destination base station. In all of these embodiments, the message adheres to the TTY standard, following a conventional TTY signaling protocol.

Figure 3:
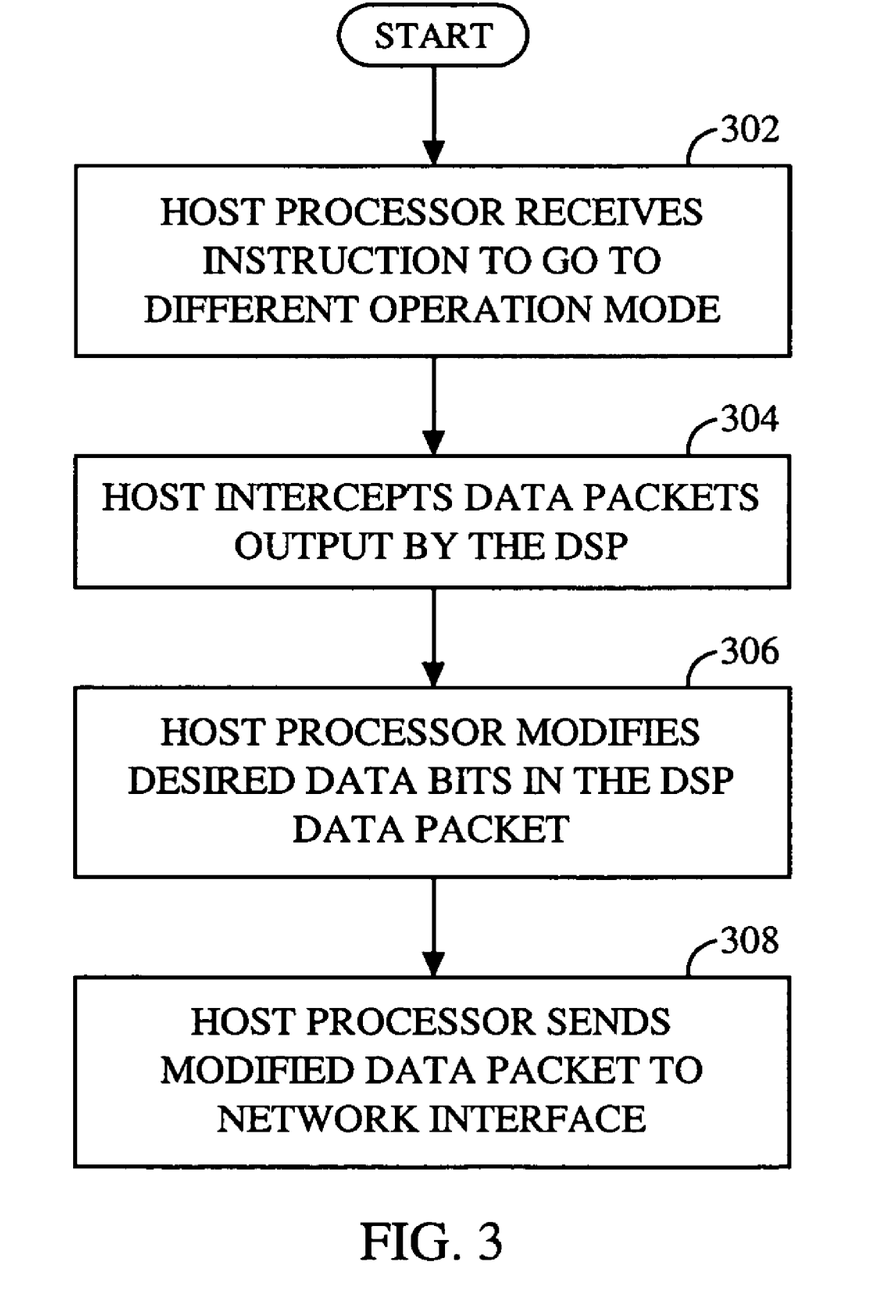
FIG. 3 is a flow diagram illustrating aspects of a host processor in an initiating device of the system illustrated in FIG. 1.

FIG 3 is a flow diagram illustrated aspects of host processor in an initiating device of the system illustrted in figure 1. flow begins in block 302 where the host processor in the initiating device receives instructions to go to a different operational mode. After receiving instructions to go to a different operational mode, the host processor may perform actions necessary for converting to the desired operational mode. For example, the host processor may direct the DSP, configured to include a vocoder, to generate data packets at a desired data rate, such as, at full data rate.

Flow continues to block 304 where the host processor of the initiating device intercepts the data packets output by the DSP. In block 306, the host processor modifies desired data bits within the intercepted data packets. For example, the host processor may modify the data packet so that it is formatted in accordance with the TTY standard. The host processor also modifies the data packet so that it contains a predetermined sequence of data to be received by a destination device.

In block 308, the host processor routes the modified data packet to network interface. For example, if the initiating device is a WCD, the host processor routes the modified data packet to a network interface that transmits the data packet to a wireless network infrastructure where the modified data packet is routed to a destination device.

Figure 4:
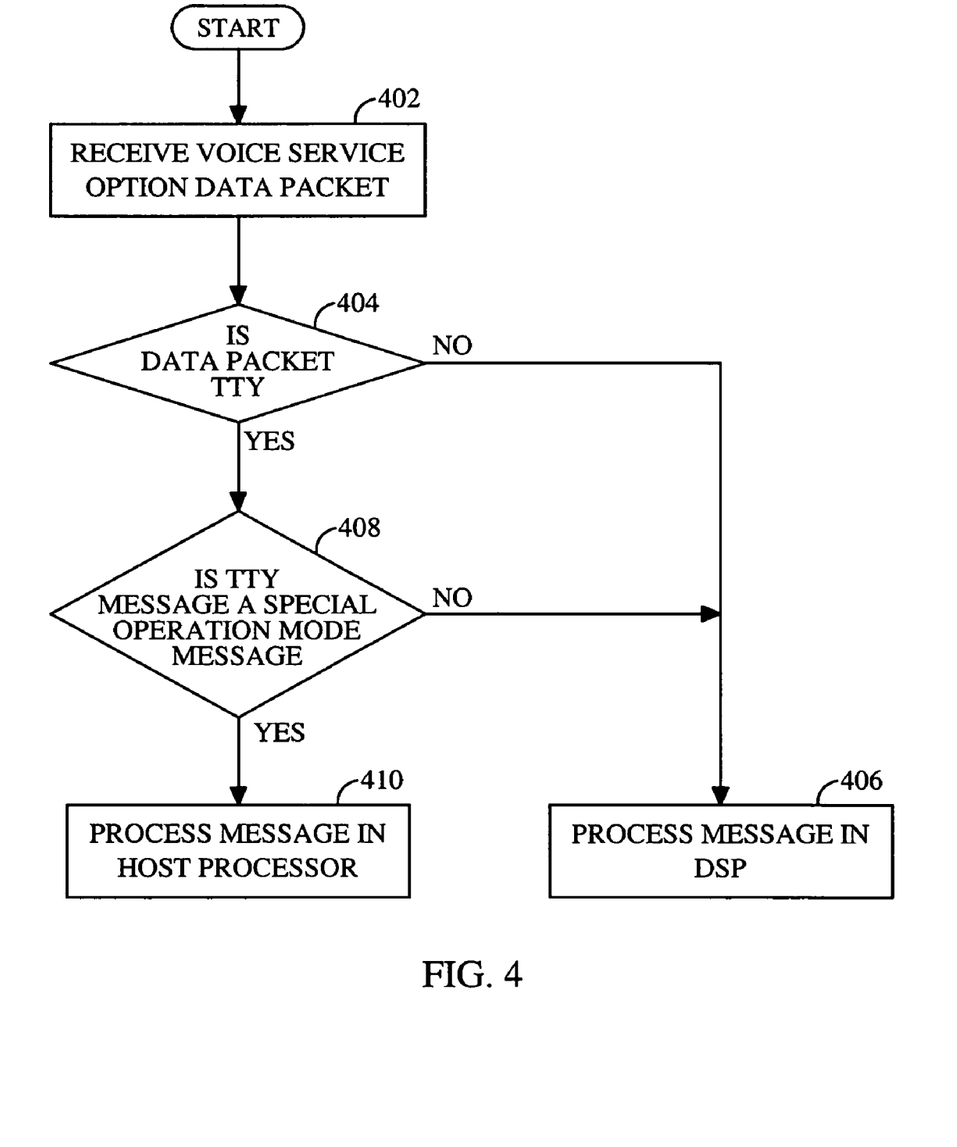
FIG. 4 is a flow diagram illustrating aspects of a host processor in a destination device of the system illustrated in FIG. 1.

FIG. 4 is a flow diagram illustrating aspects of a host processor in a destination device of the system illustrated in FIG. 1. Flow begins in block 402 where a voice service option data packet is received in the destination device and is routed to the host processor. In block 404 the host processor inspects the data packet to determine if it is a TTY data packet. If the received data packet is not a TTY data packet, then flow continues to block 406 and the data packet is routed to a digital signal processor (DSP) for processing. For example, the DSP may be configured as a vocoder to process the received voice service option data packet. If, in block 404, the host processor determines that the received data packet is a TTY data packet (an affirmative outcome at block 404) then flow continues to block 408.

In block 408, the host processor determines if the TTY message is a predetermined sequence of data indicating that a special operation message was sent by an initiating device. If the TTY message is not a predetermined sequence of data (a negative outcome at block 404) then flow continues to block 406 and the TTY packet is routed to the DSP. If, in block 408, the host processor determines that the TTY data packet contains a special operation message, then flow continues to block 410. In block 410 the host processor initiates a sequence of actions necessary for the special operation.

Figure 5:
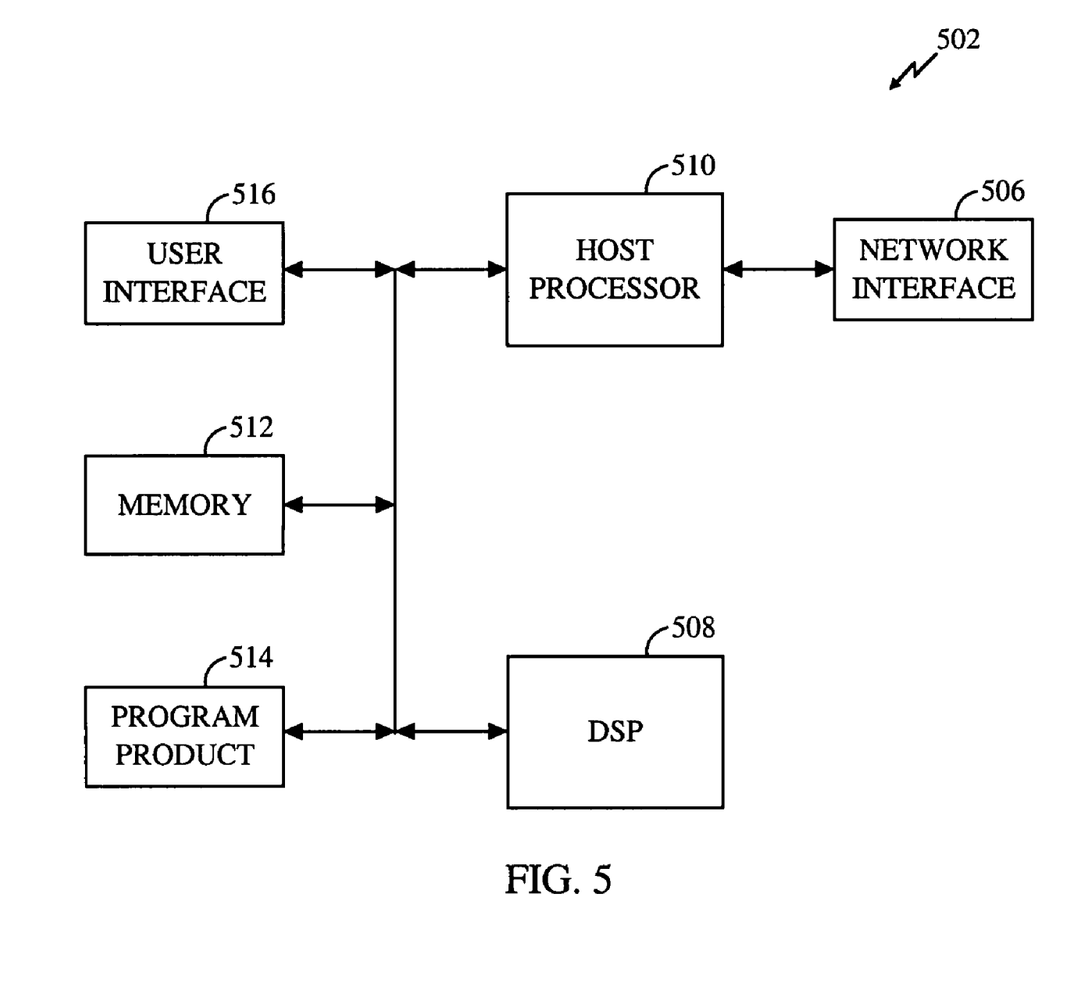
FIG. 5 is a block diagram of a communication device constructed in accordance with an exemplary embodiment of the present invention.

FIG. 5 is a block diagram of a communication device constructed in accordance with an exemplary embodiment of the present invention. The communication device 502 includes a network interface 506, digital signal processor (DSP) 508, a host processor 510, a memory device 512, a program product 514, and a user interface 516.

Signals from the infrastructure are received by the network interface 506 and sent to the host processor 510. The host processor 510 receives the signals and depending on the content of the signal responds with appropriate actions. For example, the host processor 510 may process the received signal itself, or it may route the received signal to the DSP 508 for processing. The host processor 510 may also receive signals from the DSP 508 and route these signals, unmodified, to the network interface 506 for transmission to the infrastructure. Alternatively, the host processor 510 may intercept the DSP 508 output and modify the data packets, and then route the modified data packets to the network interface 506 for transmission to the infrastructure.

In one embodiment, the network interface 506 may be a transceiver and an antenna to interface to the infrastructure over a wireless channel. In another embodiment, the network interface 506 may be a network interface card used to interface to the infrastructure over landlines.

Both the host processor 510 and the DSP 508 are connected to a memory device 512. The memory device 512 may be used to store data during operation of the WCD, as well as store program code used to program the host processor 510 or the DSP 508. For example, the host processor, DSP, or both, may operate under the control of programming steps that are temporarily stored in the memory device 512. When the programming steps are executed, the host processor or DSP, or both, perform their functions. Thus, the programming steps implement the functionality of the respective host processor or CPU. The programming steps may be received from a program product 514. The program product 514 may store, and transfer the programming steps into the memory 512 for execution by the host processor, CPU, or both.

The program product 514 may be semiconductor memory chips, such as RAM memory, flash memory, ROM memory, EPROM memory, EEPROM memory, registers, as well as other storage devices such as a hard disk, a removable disk, a CD-ROM, or any other form of storage medium known in the art that may store computer readable instructions. Additionally, the program product 514 may be the source file including the program steps that is received from the network and stored into memory and is then executed. In this way, the processing steps necessary for operation in accordance with the invention may be embodied on the program product 514. In FIG. 5, the exemplary storage medium is shown coupled to the host processor such that the host processor may read information from, and write information to, the storage medium. Alternatively, the storage medium may be integral to the host processor.

The user interface 516 is connected to both the host processor 510 and the DSP 508. For example, the user interface may include a keypad, or special function keys or buttons, that are routed to the host processor 510 and may be used by a user to request specific operation by the initiating device. For example, the user may use the keypad to dial a phone number, or to indicate that the user wants to initiate a special operational mode, such as a secure communication mode. The user interface 516 may also include a microphone and speaker that are connected to the DSP 508 and used to receive and output voice data to the user.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention is claimed is:

1. A method of changing a mode of operation of a destination communication device, the method comprising:
   establishing a voice service option communication channel between an initiating device and the destination device;
   embedding a predetermined sequence of digital data in the voice service option communication channel; and
   receiving the predetermined sequence of digital data from the initiating device at the destination device, wherein the predetermined sequence of digital data specifies a different operation mode of the destination device, and the destination device changes its operational mode in response to the predetermined sequence of digital data,
   wherein the predetermined sequence of digital data is packaged into a TTY message for data communication.

2. A method as defined in claim 1, wherein the initiating device and the destination device are wireless communication devices.

3. A method as defined in claim 1, wherein the initiating device is a wireless communication device and the destination device is a landline communication device.

4. A method as defined in claim 1, wherein the initiating device is a landline communication device and the destination device is a wireless communication device.

5. A method as defined in claim 1, wherein the initiating device and the destination device are landline communication devices.

6. A method of changing a mode of operation of a destination communication device, the method comprising:
   establishing a voice service option communication channel between an initiating device and a destination device;
   embedding a predetermined sequence of digital data in the voice service option communication channel;
   sending the predetermined sequence of digital data, from the initiating device to the destination device, that specifies a different operation mode of the destination device; and
   receiving the predetermined sequence of digital data from the initiating device at the destination device, wherein the predetermined sequence of digital data specifies a different operation mode of the destination device, and the destination device changes its operational mode in response to the predetermined sequence of digital data,
   wherein the predetermined sequence of digital data is packaged into a TTY message for data communication.

7. A method as defined in claim 6, wherein the initiating device and the destination device are wireless communication devices.

8. A method as defined in claim 6, wherein the initiating device is a wireless communication device and the destination device is a landline communication device.

9. A method as defined in claim 6, wherein the initiating device is a landline communication device and the destination device is a wireless communication device.

10. A method as defined in claim 6, wherein the initiating device and the destination device are landline communication devices.

11. A method of operating an initiating device, the method comprising:
    intercepting a data packet that would otherwise be transmitted by the initiating device;
    modifying desired data bits in the data packet such that the modified data packet comprises a predetermined sequence of data for changing a mode of operation of a destination device; and
    transmitting the modified data packet to the destination device in a voice service option communication channel,
    wherein the modified data packet is packaged into a TTY message for data communication.

12. A method as defined in claim 11, wherein the data packet is output from a digital signal processor.

13. A method as defined in claim 12, wherein the digital signal processor comprises a vocoder.

14. A method as defined in claim 11, wherein intercepting and modifying the data packet is performed by a host processor.

15. A method of changing a mode of operation of a communication device, the method comprising:
    receiving a voice service option data packet embedded in a voice service option communication channel;
    determining that the data packet is a predetermined sequence of digital data;
    determining that the predetermined sequence of digital data includes a message to change an operational mode of the communication device; and
    changing the operational mode of the communication device in response to the predetermined sequence of digital data,
    wherein the predetermined sequence of digital data is packaged into a TTY message for data communication.

16. A method as defined in claim 15, wherein the communication device is a wireless communication device.

17. A method as defined in claim 15, wherein the communication device is a landline communication device.

18. A method as defined in claim 15, wherein determining that the data packet is a predetermined sequence of data and determining that the predetermined sequence of data includes a message to change an operational mode of the communication device is performed by a host processor.

19. A communication device comprising:
    a digital signal processor that produces output data packets and provides them to a network interface; and
    a host processor that intercepts the output of the digital signal processor wherein the host processor modifies desired data bits in the digital signal processor output such that the modified data bits comprises data for changing an operational mode of another communication device, wherein the host processor embeds the modified data bits in a voice service option communication channel to route the modified output to the network interface that transmits the the modified data bits to a communication infrastructure using a voice service option operational mode,
    wherein the modified output is packaged into a TTY message for data communication.

20. A communication device as defined in claim 19, wherein the digital signal processor comprises a vocoder.

21. A communication device comprising:
    a network interface that receives data packets from a voice service option communication channel and packaged in a voice service option operational mode and outputs the data packets; and
    a host processor that receives the data packets from the network interface and determines if the received data packet includes a message to change the operational mode of the communication device, and changing the operational mode of the communication device in response to the message,
    wherein the received data packets are packaged into a TTY message for data communication.

22. A communication device as defined in claim 21, wherein the host processor sends the received data packet to a digital signal processor for processing if the received data packet does not include the message to change the operational mode of the communication device.

23. A communication device as defined in claim 22, wherein the digital signal processor comprises a vocoder.

24. A wireless communication device comprising:
a digital signal processor that produces output data packets and provides them to a network interface; and
a host processor that intercepts the output of the digital signal processor wherein the host processor modifies desired data bits in the digital signal processor output such that the modified data bits comprises data for changing an operational mode of another wireless communication device, wherein the host processor embeds the modified data bits in a voice service option communication channel to route the modified output to the network interface that transmits the modified data bits using a voice service option operational mode,
wherein the modified output is packaged into a TTY message for data communication.

25. A wireless communication device as defined in claim 24, wherein the digital signal processor comprises a vocoder.

26. A wireless communication device comprising:
a network interface that receives data packets from a voice service option communication channel and in a voice service option operational mode and outputs the data packets; and
a host processor that receives the data packets from the network interface and determines if the received data packet includes a message to change the operational mode of the wireless communication device, and changing the operational mode of the wireless communication device in response to the message,
wherein the received data packets are packaged into a TTY message for data communication.

27. A wireless communication device as defined in claim 26, wherein the host processor sends the received data packet to a digital signal processor for processing if the received data packet does not include the message to change the operational mode of the wireless communication device.

28. A wireless communication device as defined in claim 27, wherein the digital signal processor comprises a vocoder.

29. A program product for use in a wireless communication system that executes program instructions recorded in a computer-readable media to perform a method of configuring a mode of operation of a destination communication device, the program product comprising:
a recordable media; and
a plurality of computer-readable instructions executable by a wireless communication device to perform a method comprising
establishing a voice service option communication channel between an initiating device and a destination device, and
sending a predetermined sequence of digital data embedded in the voice service option communication channel, from the initiating device to the destination device, that specifies a special operation mode of the destination device,
wherein the predetermined sequence of digital data is packaged into a TTY message for data communication.

30. A program product for use in a wireless communication system that executes program instructions recorded in a computer-readable media to perform a method of configuring a mode of operation of a destination communication device, the program product comprising:
a recordable media; and
a plurality of computer-readable instructions executable by a wireless communication device to perform a method comprising
establishing a voice service option communication channel between an initiating device and a destination device, and
receiving a predetermined sequence of digital data from the initiating device that specifies a special operation mode of the destination device and changing an operational mode of the destination device in response to the predetermined sequence of digital data, wherein the predetermined sequence of digital data is packaged into a TTY message for data communication and is embedded in the voice service option communication channel.

* * * * *